United States Patent
Oh et al.

(10) Patent No.: US 9,774,049 B2
(45) Date of Patent: Sep. 26, 2017

(54) DEVICE AND METHOD FOR CONTROLLING STARTING FUEL CELL VEHICLE

(71) Applicant: Hyundai Motor Company, Seoul (KR)

(72) Inventors: Dong Jo Oh, Gyeonggi-do (KR); Jong Hyun Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/139,366

(22) Filed: Apr. 27, 2016

(65) Prior Publication Data

US 2017/0012311 A1    Jan. 12, 2017

(30) Foreign Application Priority Data

Jul. 8, 2015    (KR) .................. 10-2015-0096959

(51) Int. Cl.
| | | |
|---|---|---|
| *H01M 8/04992* | (2016.01) | |
| *B60L 11/18* | (2006.01) | |
| *H01M 8/04225* | (2016.01) | |
| *H01M 8/04302* | (2016.01) | |
| *H01M 8/04858* | (2016.01) | |
| *H01M 8/04746* | (2016.01) | |
| *H01M 8/04537* | (2016.01) | |

(52) U.S. Cl.
CPC ..... *H01M 8/04992* (2013.01); *B60L 11/1861* (2013.01); *B60L 11/1885* (2013.01); *B60L 11/1887* (2013.01); *H01M 8/04225* (2016.02); *H01M 8/04302* (2016.02); *H01M 8/04552* (2013.01); *H01M 8/04753* (2013.01); *H01M 8/04865* (2013.01); *H01M 2250/20* (2013.01); *Y02T 90/32* (2013.01)

(58) Field of Classification Search
CPC ......... H01M 8/04992; H01M 8/04225; H01M 8/04302; H01M 8/04544; H01M 8/04753; H01M 8/04865; H01M 2250/20; H60L 11/1861; H60L 11/1885; H60L 11/1887
USPC .......................................................... 701/22
See application file for complete search history.

(56) References Cited

U.S. PATENT DOCUMENTS

| | | | | |
|---|---|---|---|---|
| 6,096,448 A | * | 8/2000 | Wilkinson | H01M 8/04089 429/443 |
| 6,472,090 B1 | * | 10/2002 | Colbow | H01M 8/04223 429/443 |

(Continued)

FOREIGN PATENT DOCUMENTS

| | | |
|---|---|---|
| JP | 2006-164939 A | 6/2006 |
| JP | 2008-130358 A | 6/2008 |

(Continued)

*Primary Examiner* — Jelani Smith
*Assistant Examiner* — James E Stroud
(74) *Attorney, Agent, or Firm* — Mintz Levin Cohn Ferris Glovsky and Popeo, P.C.; Peter F. Corless (57) ABSTRACT

A method for controlling starting of a fuel cell vehicle is provided. The method includes measuring a time interval for stopping of a fuel cell and a cell average voltage of the fuel cell when the fuel cell vehicle stops. A starting mode is then switched to a catalyst activating mode when the time interval exceeds a predetermined time or the cell average voltage is greater than a predetermined voltage. The cell average voltage is decreased to be less than the predetermined voltage and the fuel cell is started by supplying air to a cathode of the fuel cell.

14 Claims, 5 Drawing Sheets

(56) References Cited

U.S. PATENT DOCUMENTS

2011/0065013 A1* 3/2011 Nishimura ........ H01M 8/04223
    429/429
2011/0129748 A1* 6/2011 Chang ............... H01M 8/04552
    429/432
2014/0335433 A1* 11/2014 Jomori ................ H01M 8/0488
    429/432

FOREIGN PATENT DOCUMENTS

KR    10-2008-0066075 A    7/2008
KR    10-1136502           4/2012

* cited by examiner

FIG. 5

DEVICE AND METHOD FOR CONTROLLING STARTING FUEL CELL VEHICLE

CROSS-REFERENCE TO RELATED APPLICATION

This application claims priority to and the benefit of Korean Patent Application No. 10-2015-0096959 filed in the Korean Intellectual Property Office on Jul. 8, 2015, the entire contents of which are incorporated herein by reference.

BACKGROUND (a) Field of the Invention

The present invention relates to a device and method for controlling starting of a fuel cell vehicle, and more particularly, to a device and method for controlling starting of a fuel cell vehicle by eliminating an oxide film formed in a surface of a catalyst.

(b) Description of the Related Art

In general, a fuel cell system is a type of power generation system configured to supply air and hydrogen to a fuel cell and generate electrical energy with electrochemical reaction of hydrogen and oxygen by the fuel cell. For example, the fuel cell system produces power from a fuel cell power plant, a public house, a factory, or the like, and is used for driving a driving source, such as an electric motor, in a vehicle, a vessel, a train, an air plane, and the like.

The fuel cell system includes a stack in which fuel cells are stacked, a hydrogen supply device configured to supply hydrogen to an anode of the fuel cells, and an air supply device configured to supply air to a cathode of the fuel cells. In the fuel cell system, external air is introduced and an oxide film is formed in a surface of a catalyst when the fuel cell is not used for a substantial period of time. When a platinum Pt catalyst is exposed to the atmosphere, oxide such as platinum oxide (PtO) and platinum dioxide ($PtO_2$) is formed. When the oxide film is formed, reactivity of the fuel cell decreases, and as a result, performance of the fuel cell and fuel consumption decrease.

The above information disclosed in this section is merely for enhancement of understanding of the background of the invention and therefore it may contain information that does not form the prior art that is already known in this country to a person of ordinary skill in the art.

SUMMARY

The present invention provides a device and method for controlling starting of a fuel cell vehicle having advantages of starting a fuel cell by eliminating an oxide film that is formed in a surface of a catalyst.

An exemplary embodiment of the present invention provides a method for controlling starting of a fuel cell vehicle that may include: measuring a time interval for stopping of a fuel cell and a cell average voltage of the fuel cell when the fuel cell vehicle stops; switching a starting mode to a catalyst activating mode when the time interval is greater than a predetermined time or the cell average voltage exceeds a predetermined voltage; decreasing the cell average voltage to be less than the predetermined voltage; and starting the fuel cell by supplying air to a cathode of the fuel cell.

The decreasing of the cell average voltage may include decreasing the cell average voltage to be less than about 0.5 V by connecting an external resistor to the fuel cell. The switching of the starting mode to the catalyst activating mode may include entering in an electric vehicle (EV) mode and driving the fuel cell vehicle using a battery when the EV mode in which the fuel cell vehicle is driven by the motor is available. The starting of the fuel cell may include starting in the catalyst activating mode, and driving using the fuel cell and the battery. The switching of the starting mode to the catalyst activating mode may include entering in the catalyst activating mode by reducing supply of air into the fuel cell. The decreasing of the cell average voltage may include decreasing air flow rate to the fuel cell, and eliminating an oxide film formed in a surface of a platinum Pt catalyst by decreasing the cell average voltage to about 0.5 V or less.

An exemplary embodiment of the present invention provides a device for controlling starting of a fuel cell vehicle that may include: a measuring unit configured to measure a time interval for stopping of a fuel cell when the fuel cell vehicle stops; and a controller configured to switch a starting mode to a normal starting mode when the time interval for stopping of the fuel cell is less than a predetermined time and switch the starting mode to a catalyst activating mode when the a time interval for stopping of the fuel cell is greater than a predetermined time.

The controller may further be configured to switch the starting mode to the catalyst activating mode when a cell average voltage of the fuel cell exceeds a predetermined voltage. The device may further include a start unit configured to decrease the cell average voltage of the fuel cell to be less than the predetermined voltage, and start the fuel cell by supplying air to a cathode of the fuel cell. The start unit may be configured to enter to the catalyst activating mode using an external resistor and a battery or by reducing supply of air into the fuel cell. The start unit may further be configured to enter an electric vehicle (EV) mode and drive the fuel cell vehicle using a battery when the EV mode in which the fuel cell vehicle is driven by the motor is available. The start unit may be configured to decrease air flow rate to the fuel cell, and decrease the cell average voltage to be less than about 0.5 V.

According to the present invention for achieving the object, by sweeping the cell voltage of the fuel cell and starting the fuel cell when the fuel cell vehicle starts after stopping for a substantial period of time, it may be possible to eliminate an oxide film formed in a surface of a catalyst, and improve fuel consumption of the fuel cell.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

In the following detailed description, exemplary embodiments of the present invention will be shown and described, simply by way of illustration. As those skilled in the art would realize, the described exemplary embodiments may be modified in various different ways, all without departing from the spirit or scope of the present invention. Accordingly, the drawings and description are to be regarded as illustrative in nature and not restrictive. Like reference numerals designate like elements throughout the specification.

Furthermore, each of the terms "unit", "-er", "-or", "module", and "block" described in the specification refers to a unit that processes at least one function or operation, which may be implemented by hardware, software, or a combination of thereof.

Figure 1:
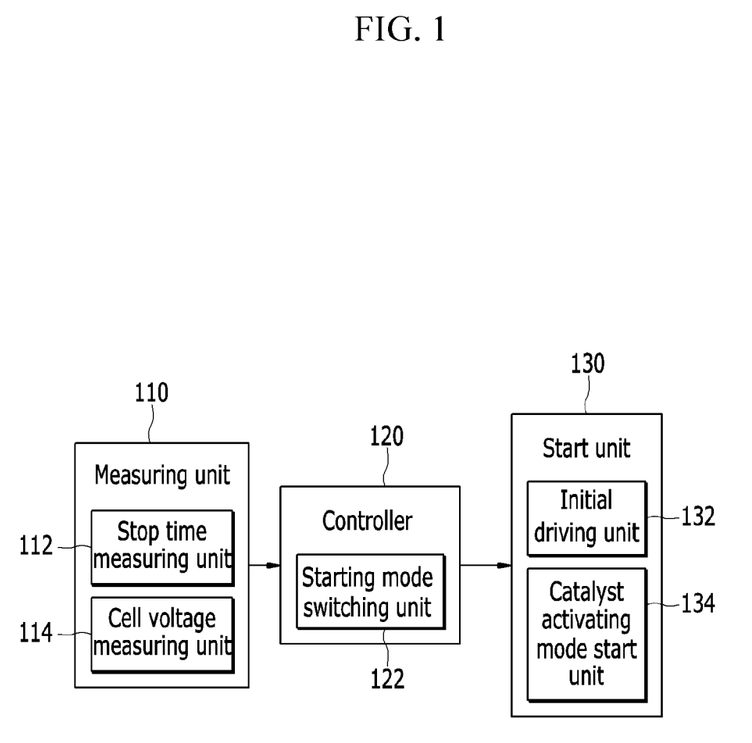
FIG. 1 is a schematic diagram of a device for controlling starting of a fuel cell vehicle according to an exemplary embodiment of the present invention.

A device and method for controlling starting of a fuel cell vehicle will now be described with reference to FIG. 1 to FIG. 5. FIG. 1 is a schematic diagram of a device for controlling starting of a fuel cell vehicle according to an exemplary embodiment of the present invention. In particular, for convenience of explanation, a configuration of the device for controlling starting of a fuel cell vehicle according to the exemplary embodiment of the present invention is schematically illustrated, but the diesel engine is not limited thereto.

Referring to FIG. 1, the device for controlling starting of a fuel cell vehicle 100 an exemplary embodiment of the present invention may include a measuring unit 110, a controller 120, and a start unit 130. The controller 120 may be configured to operate the measuring unit 110 and the start unit 130 and the measuring unit 110 may be a type of sensor. Particularly, the measuring unit 110 may be configured to measure a time interval for stopping of a fuel cell and a cell average voltage of the fuel cell when the fuel cell vehicle stops. The measuring unit 110 may then be configured to transmit the measured data to the controller 120.

Furthermore, the measuring unit 110 may include a stop time measuring unit 112 and a cell voltage measuring unit 114 according to an exemplary embodiment of the present invention. The stop time measuring unit 112 may be configured to measure the time interval for stopping of the fuel cell using a timer, and the cell voltage measuring unit 114 may be configured to measure a cell voltage of fuel cell. The controller 120 may be configured to determine whether to switch a starting mode of the fuel cell using the time interval for stopping of the fuel cell and a cell average voltage of the fuel cell transmitted from the measuring unit 110.

The controller 120 may include a starting mode switching unit 122 according to an exemplary embodiment of the present invention. In particular, the start mode switching unit 122 may be configured to maintain a normal starting mode when fuel the time interval for stopping of the fuel cell is less than a predetermined time interval. The starting mode switching unit 122 may be configured to switch the starting mode to a catalyst activating mode when the time interval is greater than a predetermined time interval. The starting mode switching unit 122 may further be configured to switch the starting mode to the catalyst activating mode when the cell average voltage of the fuel cell exceeds a predetermined voltage.

The device for controlling starting of a fuel cell vehicle 100 according to an exemplary embodiment of the present invention may be configured to enter the catalyst activating mode using an external resistor and a battery or by reducing supply of air into the fuel cell. To eliminate an oxide film formed in a surface of a catalyst, the start unit 130 may be configured to sweep the cell average voltage to be less than the predetermined voltage when the vehicle starts, and then may be configured to start the fuel cell. Herein, the sweeping may include a process for increasing or decreasing a voltage of a fuel cell stack to the predetermined voltage. According to an exemplary embodiment of the present invention, the voltage of the fuel cell stack may be decreased using an external resistor or a battery connected to the fuel cell.

Furthermore, the start unit 130 may include an initial driving unit 132 and a catalyst activating mode start unit 134 according to an exemplary embodiment of the present invention. When an electric vehicle (EV) mode in which the fuel cell vehicle is driven by the motor is available, the initial driving unit 132 may be configured to adjust the starting mode to enter the EV mode. The initial driving unit 132 may be configured to perform initial drive of the vehicle using the battery.

Additionally, the catalyst activating mode start unit 134 may be configured to decrease air flow rate to the fuel cell, sweep the cell average voltage to be less than the predetermined voltage, and then start the fuel cell. Herein, the catalyst activating mode start unit 134 may be configured to start the fuel cell after the cell average voltage is swept to about 0.5 V or less. Accordingly, the controller 120 may be implemented with at least one processor operating by a predetermined program, and the predetermined program may be programmed to perform each step according to the method for controlling starting of a fuel cell vehicle according to an exemplary embodiment of the present invention.

Figure 2:
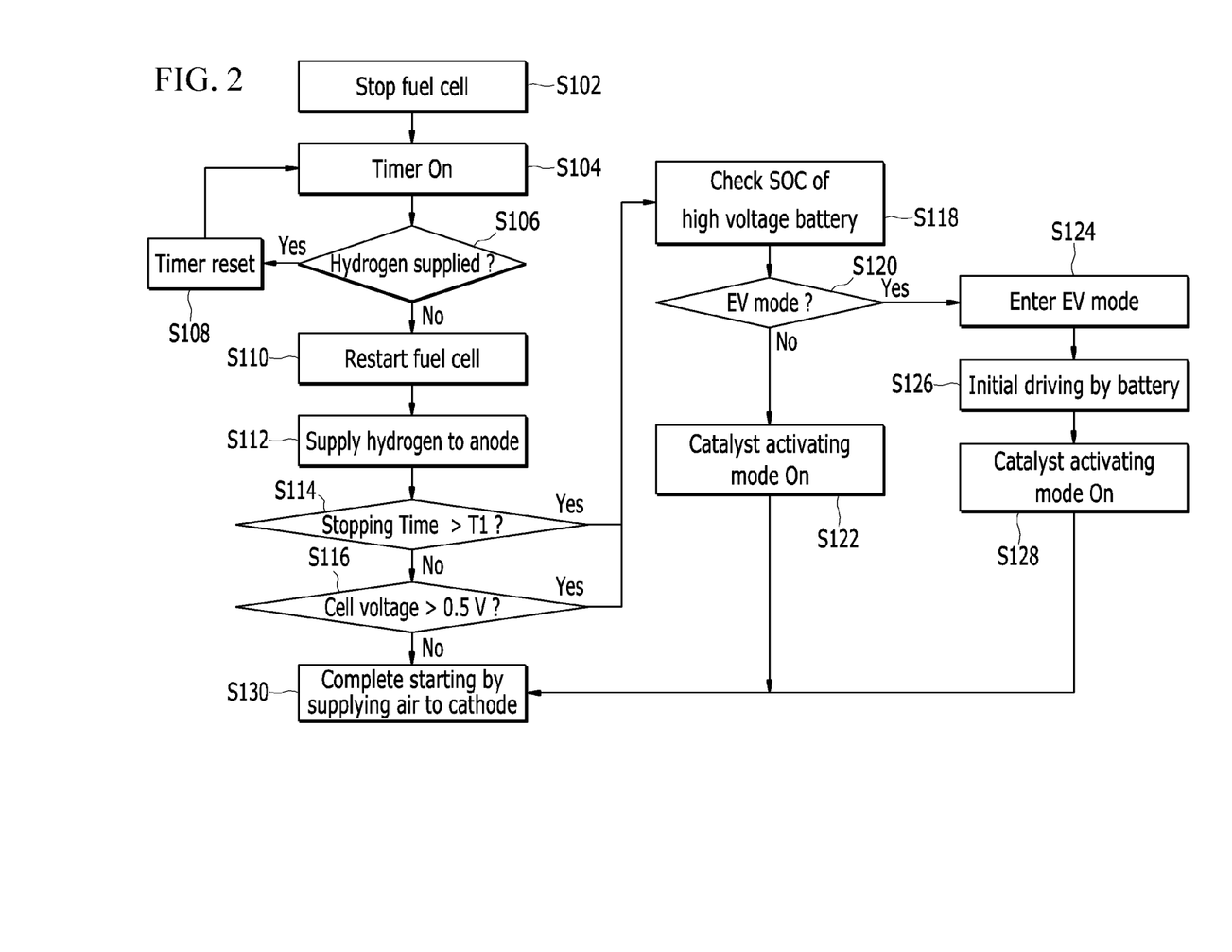
FIG. 2 is a flowchart briefly showing a process for starting of a fuel cell vehicle according to an exemplary embodiment of the present invention.

FIG. 2 is a flowchart briefly showing a process for starting of a fuel cell vehicle according to an exemplary embodiment of the present invention. The flowchart will be described with the same reference numerals as those of the configuration of FIG. 1. Referring to FIG. 2, the device for controlling starting of a fuel cell vehicle 100 according to an exemplary embodiment of the present invention may be configured to measure a time interval for stopping of the fuel cell using a timer when the fuel cell vehicle stops at steps S102 and S104.

The device for controlling starting of a fuel cell vehicle 100 may be configured to reset the timer when hydrogen is supplied to an anode while stopping the fuel cell at steps S106 and S108. When the fuel cell is restarted by a driver, the device for controlling starting of a fuel cell vehicle 100 may be configured to supply the hydrogen to the anode at steps S110 and S112. Additionally, the device may be configured to detect a state of charge (SOC) of a high voltage battery when the time interval for stopping of the fuel cell is greater than a predetermined time T1 or the cell average voltage is greater than about 0.5 V at steps S114 to S118. Herein, the predetermined time may be set to about 48 hours according to an exemplary embodiment of the present invention.

When the EV mode is not possible or accessible, the catalyst activating mode may be turned on without an initial driving of the vehicle at steps S120 to S124. When the EV mode is possible, the vehicle may be configured to enter the EV mode, and the catalyst activating mode may be turned on after the initial driving of the vehicle using the battery at steps S126 to S130. The device for controlling starting of a fuel cell vehicle 100 may then be configured to may further be configured to drive the vehicle using the fuel cell and the battery when the vehicle is entered to the EV mode and started by the catalyst activating mode.

Figure 3:
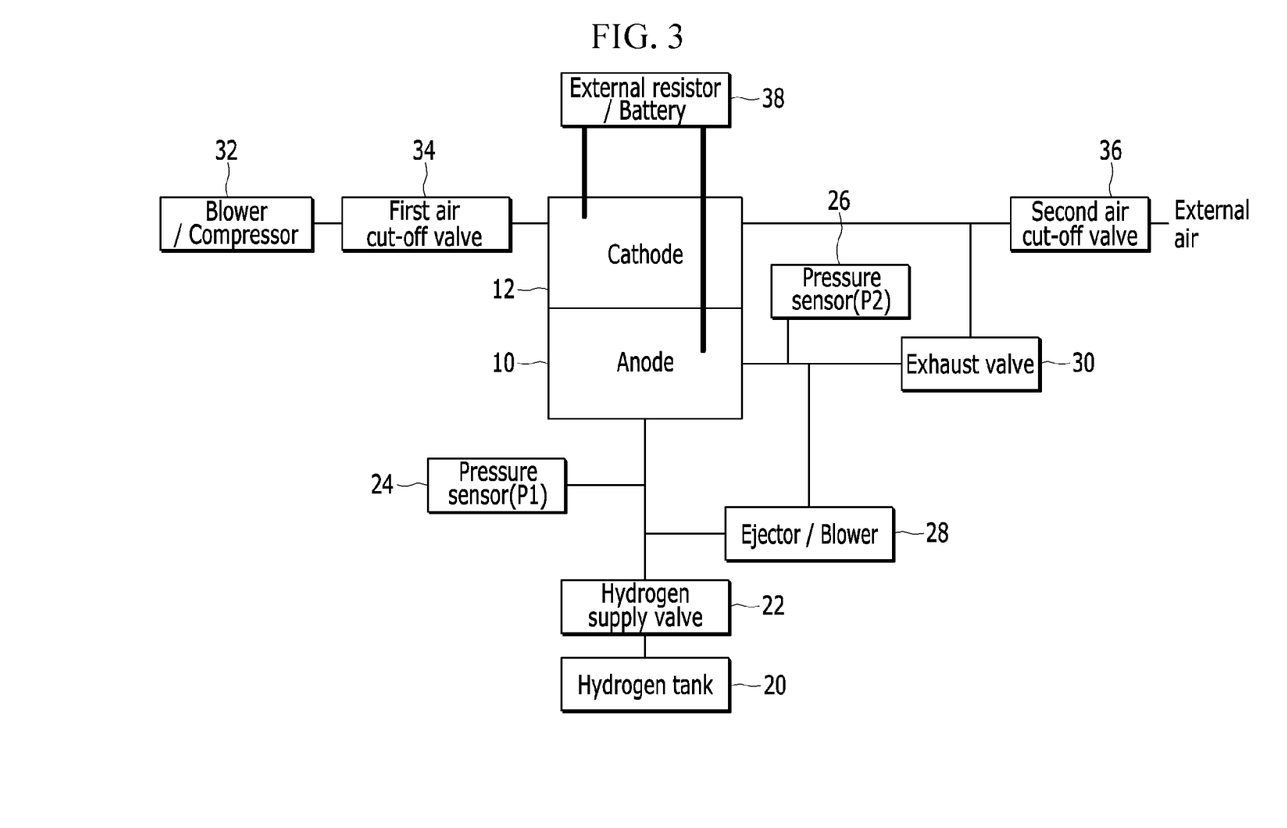
FIG. 3 is a schematic diagram of a fuel cell system applicable to a method for controlling starting of a fuel cell vehicle according to an exemplary embodiment of the present invention.

FIG. 3 is a schematic diagram of a fuel cell system that is applicable to a method for controlling starting of a fuel cell vehicle according to an exemplary embodiment of the present invention. Referring to FIG. 3, the fuel cell system may be configured to supply hydrogen stored in the hydrogen tank 20 to an anode 10 of the fuel cell by operating a hydrogen supply valve 22 and measure the pressure using a first pressure sensor 24.

The fuel cell system may forcibly reduce a voltage of a fuel cell stack using an external resistor (or battery) 38. A blower or compressor 32 may be configured to supply air to a cathode 12 of fuel cell, and the first air cut-off valve 34 may be configured to prevent inflow of air from the blower or compressor 32. The second air cut-off valve 36 may be configured to prevent inflow of external air to the cathode of the fuel cell. The fuel cell system may further be configured to recirculate hydrogen gas that is not reacted by an ejector or blower 28 and measure the hydrogen pressure exhausted from the stack by a second pressure sensor 26. Further, impurities within the anode may be exhausted to the outside via an exhaust valve 30. The fuel cell system may be configured to aspirate air of the cathode line using the exhausted gas of the anode.

Figure 4:
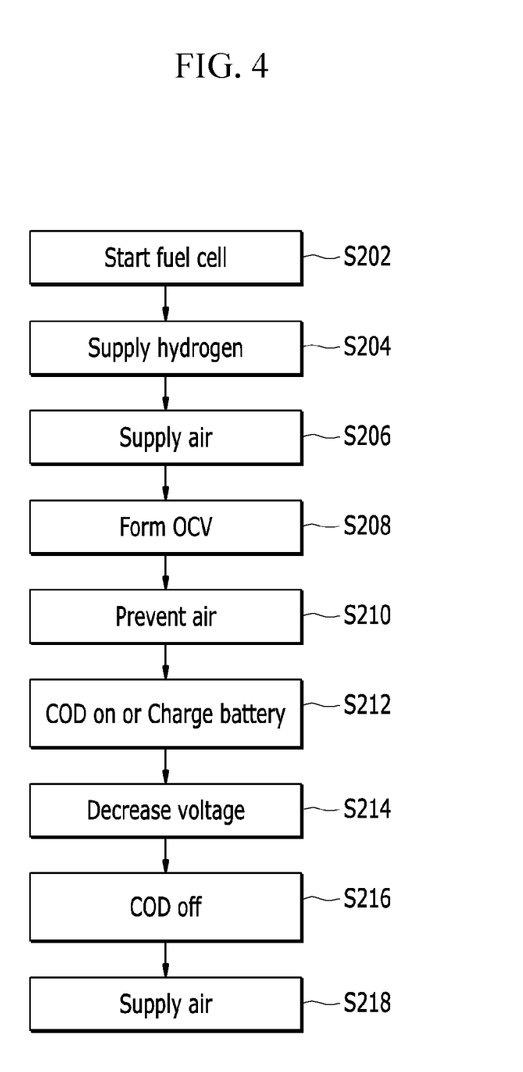
FIG. 4 is a flowchart briefly showing a process for starting of a catalyst activating mode using an external resistor or a battery according to a first exemplary embodiment of the present invention.

FIG. 4 is a flowchart briefly showing a process for starting of a catalyst activating mode by using an external resistor or a battery according to a first exemplary embodiment of the present invention. Referring to FIG. 4, the device for controlling starting of a fuel cell vehicle 100 according to an exemplary embodiment of the present invention may be configured to supply the hydrogen to the fuel cell when the driver starts the fuel cell at steps S202 and S204.

Particularly, the device may be configured to supply air to the fuel cell, and may form an open circuit voltage (OCV) at steps S206 and S208. Further, the device may be configured to prevent the flow of air, and turn on cathode oxygen depletion (COD) or charge the battery at steps S210 and S212. In addition, the device may be configured to decrease the cell average voltage to be less than about 0.5 V, and turn off the COD or complete the battery charging at steps S214 and S216. Herein, the device for controlling starting of a fuel cell vehicle 100 may be configured to decrease the cell average voltage to be less than about 0.5 V using an external resistor or battery 38. The may be configured to supply air to the cathode the fuel cell and complete the starting at step S218.

Figure 5:
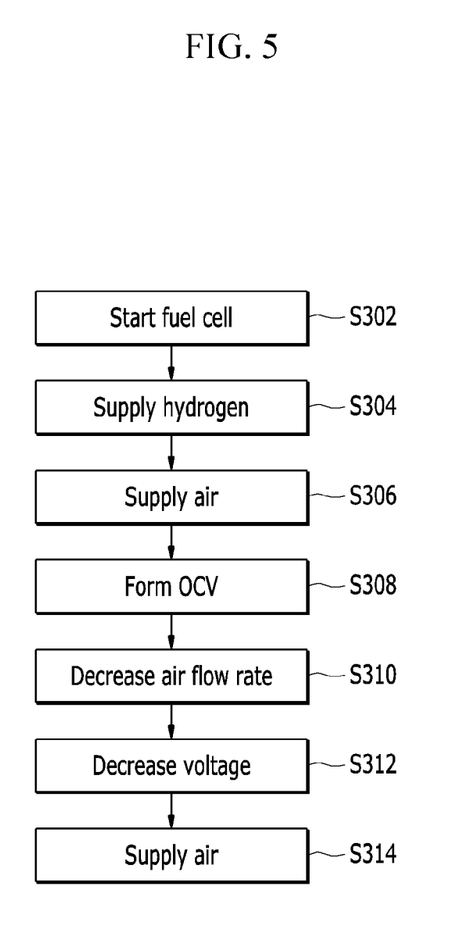
FIG. 5 is a flowchart briefly showing a process for starting of a catalyst activating mode by reducing supply of air into the fuel cell according to a second exemplary embodiment of the present invention.

FIG. 5 is a flowchart briefly showing a process for starting of a catalyst activating mode by reducing supply of air into the fuel cell according to a second exemplary embodiment of the present invention. Referring to FIG. 5, the device for controlling starting of a fuel cell vehicle 100 according to an exemplary embodiment of the present invention may be configured to supply the hydrogen to the fuel cell when the driver starts the fuel cell at steps S302 and S304.

The device may further be configured to supply air to the fuel cell, and may form the OCV at steps S306 and S308. The device may be configured to decrease air flow rate to the fuel cell, and sweep by decreasing the cell average voltage of the fuel cell to about 0.5 V or less at steps S310 and S312. The device may be configured to supply air to the cathode the fuel cell and complete the starting at step S314. Therefore, when the fuel cell is started by the catalyst activating mode according to an exemplary embodiment of the present invention, the voltage may be increased to about 2.5 V more on average than at normal starting. As a result, a fuel consumption of starting by the catalyst activating mode may increase about 1% more than at normal starting.

As described above, the device for controlling starting of a fuel cell vehicle according to an exemplary embodiment of the present invention may be configured to sweep the cell voltage of the fuel cell and start the fuel cell when the fuel cell vehicle starts after stopping for a substantial period of time. Therefore, it may possible to eliminate an oxide film formed in a surface of a catalyst, and improve fuel consumption of the fuel cell.

The foregoing exemplary embodiments of the present invention are not implemented only by an apparatus and a method, and therefore may be realized by programs realizing functions corresponding to the configuration of the exemplary embodiment of the present invention or recording media on which the programs are recorded. Such recording media may be executed in a user terminal as well as a server.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A method for controlling starting of a fuel cell vehicle, comprising:
    measuring, by a controller, a time interval for stopping of a fuel cell and a cell average voltage of the fuel cell when the fuel cell vehicle stops;
    switching, by the controller, a starting mode to a catalyst activating mode when the time interval is greater than a predetermined time or the cell average voltage exceeds a predetermined voltage;
    decreasing, by the controller, the cell average voltage to be less than the predetermined voltage; and
    starting, by the controller, the fuel cell by supplying air to a cathode of the fuel cell,
    wherein the decreasing of the cell average voltage includes decreasing the cell average voltage by connecting an external resistor to the fuel cell.

2. The method of claim 1, wherein the decreasing of the cell average voltage includes decreasing the cell average voltage to be less than about 0.5 V by connecting the external resistor to the fuel cell.

3. The method of claim 2, wherein the switching of the starting mode to the catalyst activating mode includes entering in, by the controller, an electric vehicle (EV) mode and driving the fuel cell vehicle using a battery when the EV mode in which the fuel cell vehicle is driven by the motor is available.

4. The method of claim 3, wherein the starting the fuel cell includes starting in the catalyst activating mode, and driving the vehicle using the fuel cell and the battery.

5. The method of claim 1, wherein the switching of the starting mode to the catalyst activating mode includes entering in the catalyst activating mode by reducing supply of air into the fuel cell.

6. The method of claim 1, wherein the decreasing of the cell average voltage includes decreasing air flow rate to the fuel cell, and eliminating an oxide film formed in a surface of a platinum catalyst by decreasing the cell average voltage to about 0.5 V or less.

7. A device for controlling starting of a fuel cell vehicle, comprising: a measuring unit configured to measure a time interval for stopping of a fuel cell when the fuel cell vehicle stops; and a controller configured to switch a starting mode to a normal starting mode when the a time interval for stopping of the fuel cell is less than a predetermined time and switch the starting mode to a catalyst activating mode when the time interval for stopping of the fuel cell is greater than a predetermined time, wherein the controller is configured to enter in an electric vehicle (EV) mode and drive the fuel cell vehicle using a battery when the EV mode is available; wherein the controller is configured to switch the starting mode to the catalyst activating mode when a cell average voltage of the fuel cell exceeds a predetermined voltage; a start unit configured to decrease the cell average voltage of the fuel cell to be less than the predetermined voltage, and start the fuel cell by supplying air to a cathode of the fuel cell; and wherein the start unit is configured to enter to the catalyst activating mode using an external resistor and a battery or by reducing supply of air into the fuel cell.

8. The device of claim 7, wherein the start unit is configured to decrease air flow rate to the fuel cell, and decrease the cell average voltage to be less than about 0.5 V.

9. A non-transitory computer readable medium containing program instructions for controlling starting of a fuel cell vehicle executed by a controller, the computer readable medium comprising:
    program instructions that measure a time interval for stopping of a fuel cell and a cell average voltage of the fuel cell when the fuel cell vehicle stops;
    program instructions that switch a starting mode to a catalyst activating mode when the time interval is greater than a predetermined time or the cell average voltage exceeds a predetermined voltage;
    program instructions that decrease the cell average voltage to be less than the predetermined voltage; and
    program instructions that start the fuel cell by supplying air to a cathode of the fuel cell,
    wherein the program instructions that decrease the cell average voltage include program instructions that decrease the cell average voltage by connecting an external resistor to the fuel cell.

10. The non-transitory computer readable medium of claim 9, wherein the program instructions that decrease the cell average voltage include program instructions that decrease the cell average voltage to be less than about 0.5 V by connecting the external resistor to the fuel cell.

11. The non-transitory computer readable medium of claim 10, wherein the program instructions that switch the starting mode to the catalyst activating mode include program instructions that enter in an electric vehicle (EV) mode and drive the fuel cell vehicle using a battery when the EV mode in which the fuel cell vehicle is driven by the motor is available.

12. The non-transitory computer readable medium of claim 11, wherein the program instructions that start the fuel cell include program instructions that start in the catalyst activating mode, and drive the vehicle using the fuel cell and the battery.

13. The non-transitory computer readable medium of claim 9, wherein the program instructions that switch the starting mode to the catalyst activating mode include program instructions that enter in the catalyst activating mode by reducing supply of air into the fuel cell.

14. The non-transitory computer readable medium of claim 9, wherein the program instructions that decrease the cell average voltage include program instructions that decease air flow rate to the fuel cell, and eliminate an oxide film formed in a surface of a platinum catalyst by decreasing the cell average voltage to about 0.5 V or less.

* * * * *